United States Patent [19]

Kaske et al.

[11] 3,798,623

[45] Mar. 19, 1974

[54] QUAD DENSITY SOLID STACK MEMORY

[75] Inventors: Alan D. Kaske; Maynard C. Paul, both of Minneapolis; Charles H. Tolman, Bloomington, all of Minn.

[73] Assignee: Sperry Rand Corporation, New York, N.Y.

[22] Filed: July 20, 1972

[21] Appl. No.: 273,663

[52] U.S. Cl. ................340/174 MA, 340/174 BC, 340/174 DA, 340/174 GP, 340/174 M, 340/174 PC, 340/174 QA, 340/174 S, 340/174 TF

[51] Int. Cl. ......................... G11c 5/08, G11c 11/14

[58] Field of Search.... 340/174 M, 174 BC, 174 PC

[56] References Cited

UNITED STATES PATENTS

R27,395 6/1972 Bergman et al. ............. 340/174 BC

*Primary Examiner*—James W. Moffitt

*Attorney, Agent, or Firm*—Kenneth T. Grace; Thomas J. Nikolai

[57] ABSTRACT

An electrically-alterable, random-access memory system that uses Mated-Film elements as the memory cells is disclosed. The memory cells are arranged on each two-dimensional memory plane along two parallel running sense-digit lines while a single word line, passing orthogonally through the stacked, superposed memory planes of the so-formed three-dimensional Solid Stack memory, is inductively coupled to a pair of memory cells, one associated with each sense-digit line, on each memory plane. Thus, a word drive signal from a single word line is coupled to two memory cells on each memory plane forming a memory word of a length that is equal to 2 bits per memory plane times the number of memory planes in the stack.

4 Claims, 17 Drawing Figures

QUAD DENSITY SOLID STACK MEMORY

BACKGROUND OF THE INVENTION

The present invention is considered to be an improvement type invention over that of the R. J. Bergman, et al., U.S. Pat. No. 3,435,435 entitled "Solid Stack Memory", now reissue U.S. Pat. No. Re. 27,395. In the Solid Stack memory of that patent the Mated-Film elements that form the memory cells are arranged on each two-dimensional memory plane along two parallel running sense-digit lines. Each word line is formed of two parallel running segments, intercoupled at the bottom to form a single continuous word line, that pass orthogonally down and back up through the stacked, superposed memory planes of the three-dimensional Solid Stack memory which word line is inductively coupled to only one memory cell on each memory plane. It has been found that the Mated-Film elements, when accompanied by the proper magnetic keeper, operate so efficiently that a greater than previously believed density packaging scheme is possible.

SUMMARY OF THE INVENTION

In the present invention the bit density of the Solid Stack memory of U.S. Pat. No. 3,435,435 of, e.g., 1,024 1-bit words (memory cells) per memory plane has been quadrupled to, e.g., 2,048 2-bit words per memory plane. This increase in bit density has been achieved by eliminating the return segment of the vertically running word line and decreasing the planar size of the memory cells which change in size permits, through the use of a hard axis field magnetic keeper, a substantial reduction in drive signal current amplitudes and a concurrent readout of two memory cells per memory plane. This doubles the number of sense amplifiers required per memory plane, but as there are now four times the number of memory elements per memory plane there are now twice the number of memory elements per sense amplifier.

DESCRIPTION OF THE PREFERRED EMBODIMENT

Figure 1:
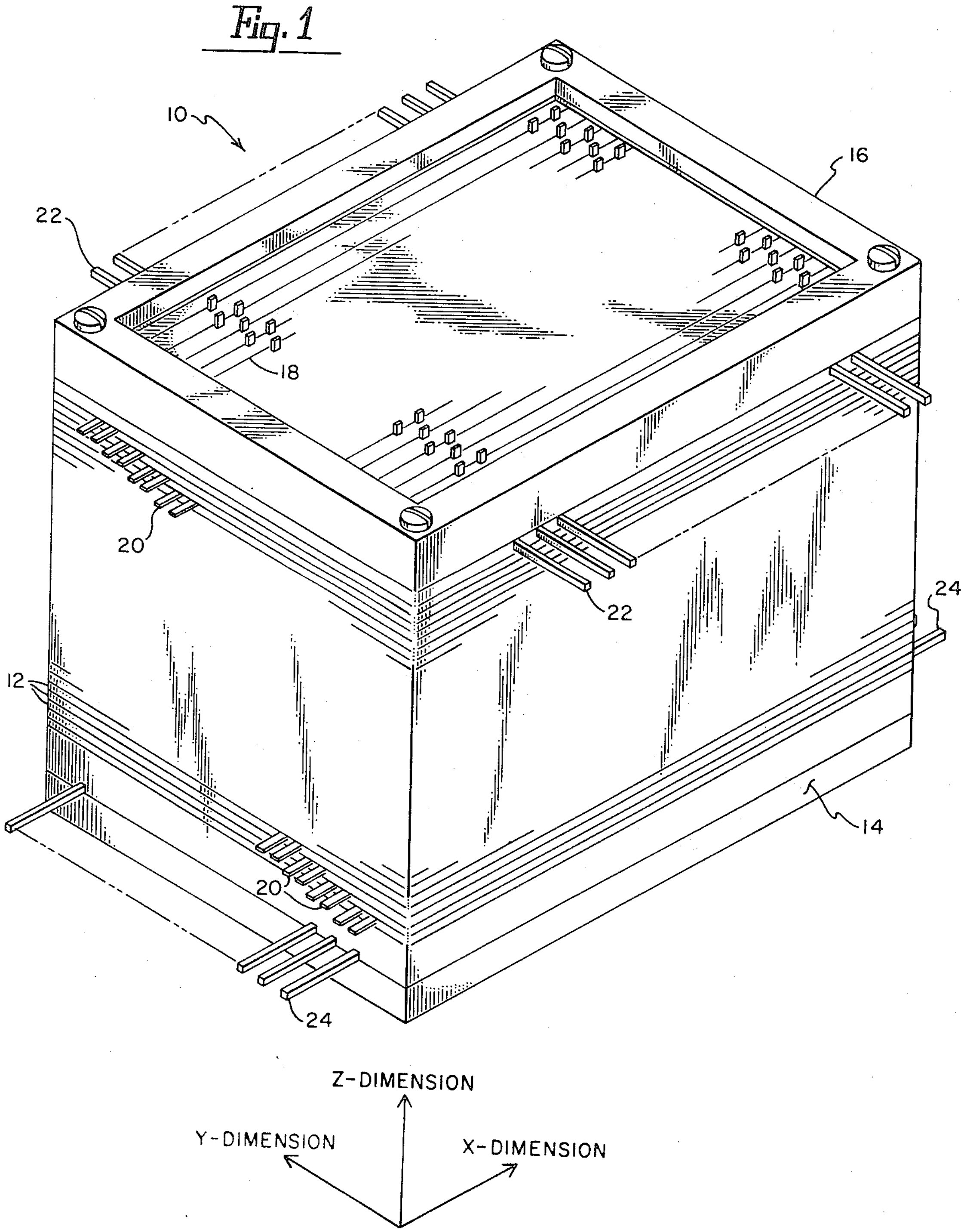
FIG. 1 is an isometric view of the memory stack of the present invention.

With particular reference to FIG. 1 there is presented an isometric view of memory stack 10 which is comprised of 128 memory planes 12 sandwiched between base plate 14 and top plate 16 upon which are mounted 32 diode assemblies 18. Memory stack 10 provides a random access, electrically-alterable, non-destructive readout memory system having a capacity of 2,048 words each of 256 bits in length and is arranged in 128 memory planes 12, each memory plane 12 having a 32 × 64 array of memory cells—32 × 64 vertically oriented single word lines are each coupled to the two memory elements of the one associated memory cell on each memory plane 12. Projecting from the surfaces of memory stack 10 are: 512 sense-digit line leads 20, four leads 20 per memory plane 12, staggered so as to provide maximum connector clearance therebetween; 64 upper diverter selection lines 22, 32 each side; and 32 lower diverter selection lines 24, 16 each side. These 608 leads provide all the necessary electronic interconnections between the 2,048 words of 256 bits in length of memory storage and the external memory electronics.

Figures 2, 3, 4:
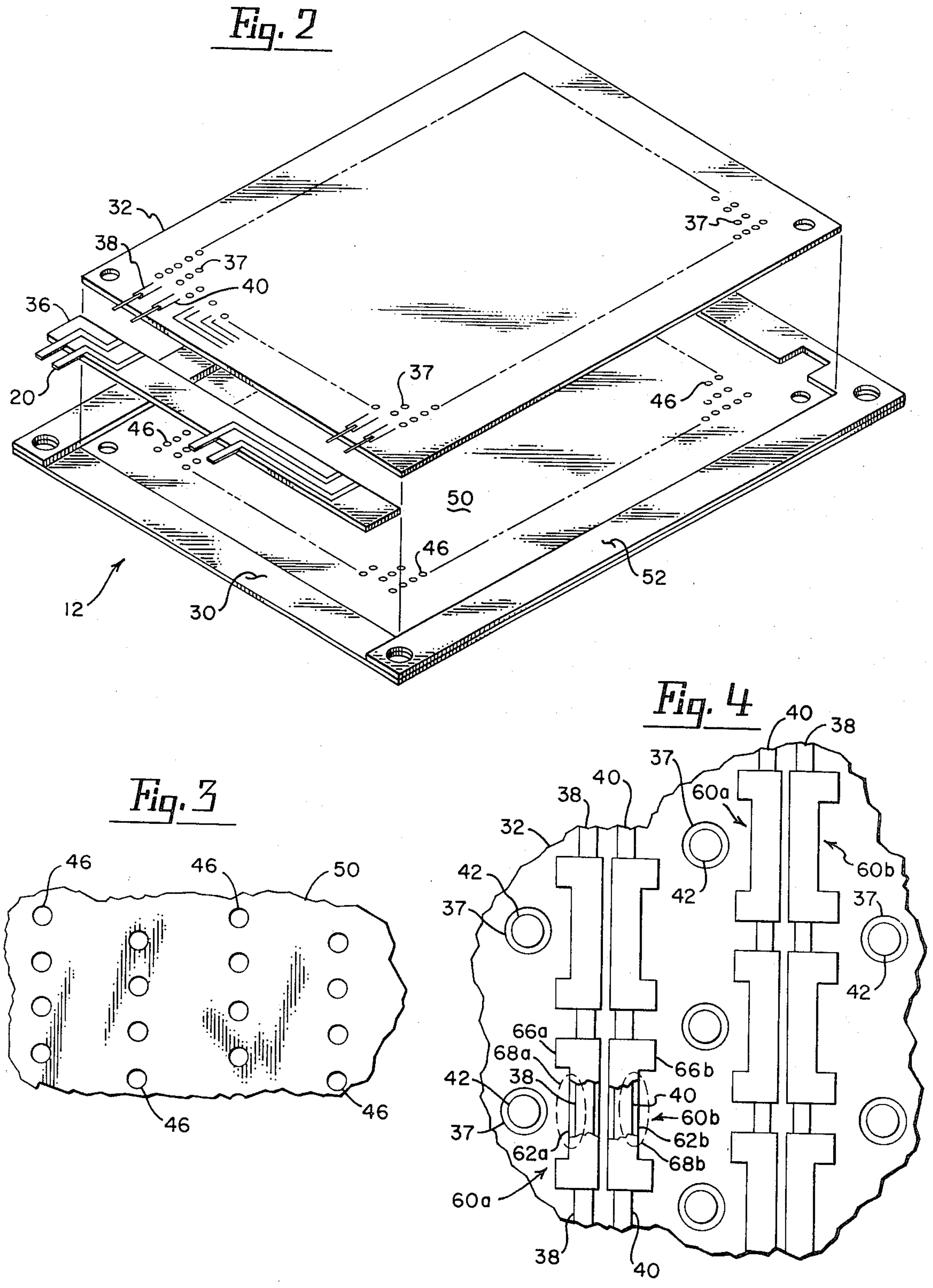
FIG. 2 is an exploded view of a memory plane of the present invention.
FIG. 3 is an illustration of the detail of the hole pattern in the shield-plate of FIG. 2.
FIG. 4 is an illustration of the arrangement of the memory elements in the memory plane of FIG. 2.

With particular reference to FIG. 2 there is illustrated an exploded view of a memory plane 12 showing the stacked arrangement of shield-plate 30, substrate 32, and terminal strip 36. Shield-plate 30 functions as a ground plane providing electrostatic shielding of all external fields for the internally sandwiched memory elements on substrate 32. Additionally, as the word lines pass through memory planes 12 perpendicular to the associated sense-digit lines, electromagnetic coupling therebetween is substantially zero. In the illustrated embodiment, shield-plate 30 and substrate 32 are substantially similar for all memory planes 12 while terminal strip 36 has its pairs of sense-digit line leads 20 arranged in a staggered manner, as exemplified by the illustrated embodiment of FIG. 1, to provide maximum connector clearance between adjacent superposed memory planes 12. Memory plane 12 is an integral assembly of its constituent parts formed by the bonding of such parts by a suitable adhesive and the welding, or soldering, of pairs of sense-digit lines 38, 40 to the correspondingly ordered pairs of sense-digit line leads 20 of terminal strip 36.

With particular reference to FIG. 3 there is illustrated a detail of the hole pattern in shield-plate 30. As illustrated in FIG. 2, shield-plate 30 performs the function of a support and locating member for substrate 32. Shield-plate 30 consists of a 0.004 inch thick copper-beryllium base plate 50 and 0.011 inch thick epoxy-glass laminated frame 52 bonded thereto by a suitable adhesive material. Holes 46 are positioned in shield-plate 30 so as to cooperate with the like-arranged holes in substrate 32 to permit the vertically oriented word lines, which word lines will be discussed hereinbelow, to pass therethrough.

With particular reference to FIG. 4 there is illustrated a detail of the arrangement of the memory elements on substrate 32. FIG. 4 illustrates the plan view of a plurality of Mated-Film elements 60 wherein there is illustrated a stacked arrangement of substrate 32, a thin ferromagnetic film layer 62, a copper conductor 38 or 40 and a thin ferromagnetic film layer 66. As will be described in more detail hereinbelow, sense-digit lines 38, 40 are insulated from layers 62 and 66 by a suitable material such as a vapor deposited layer of silicone monoxide (SiO), such insulating layer is not illustrated for the sake of clarity. Areas 68*a* (and 68*b*) are the Mated-Film areas of memory elements 60*a* (and 60*b*) wherein layers 62*a* and 66*a* (and 62*b* and 66*b*) are not magnetically insulated from each other by sense-digit lines 38 (and 40) and wherein flux induced in such layers finds a substantially-closed flux path therebetween separated only by the aforementioned insulating layers. Holes 37 are suitably oriented with respect to the respectively associated pair of memory elements 60*a* and 60 *b* and cooperate with holes 46 in shield-plate 30 and the hereinbelow to be discussed keepers permitting unobstructed passage therethrough in memory plane 12 of the hereinbelow to be discussed word lines 42.

Figure 5A:
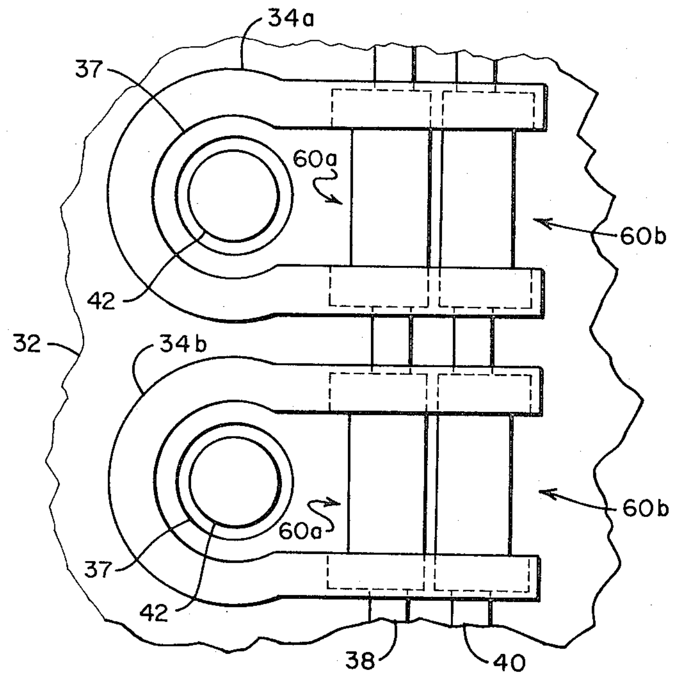
FIGS. 5*a* and 5*b* are illustrations of different embodiments of the keeper of the present invention.
Figure 5B:
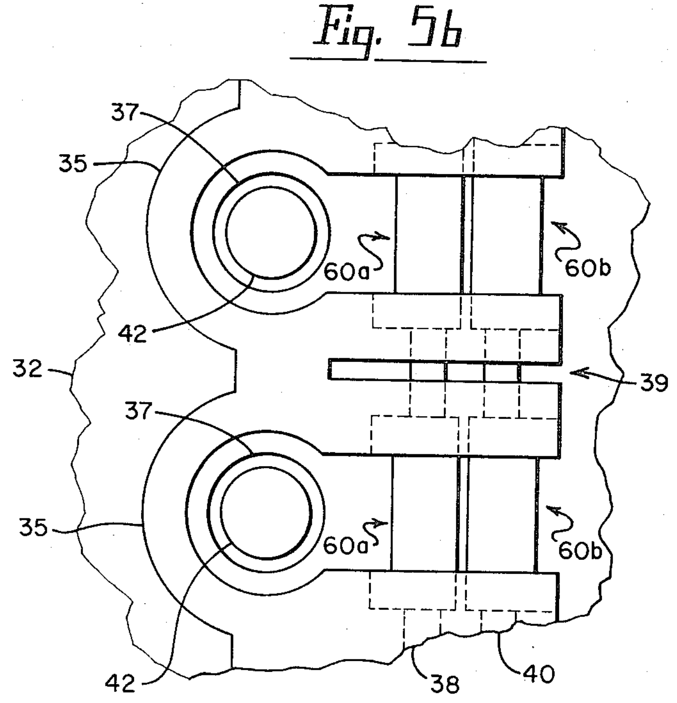

With particular reference to FIG. 5a there is illustrated a detail of a magnetic keeper arrangement associated with each pair of associated Mated-Film memory elements 60*a*, 60*b* and the one vertically associated word line 42. Affixed to the surface of substrate 32 are parallel running sense-digit lines 38, 40 about which are formed two Mated-Film elements 60*a*, 60*b*. Keeper 34a is affixed thereto for providing a continuous flux path, to a magnetic field generated by a current signal coupled to vertically oriented word line 42, about word line 42 and across the ends of memory elements 60*a*, 60*b*. Keeper 34*a* is formed of a sheet of high permeability material, such as Conetic, 0.002 inch thick affixed to an insulative layer such as Mylar of 0.005 inch thick which is affixed to substrate 32 by a suitable adhesive. As will be more fully described hereinbelow, keeper 34*a* performs the function of providing a high permeability return path for the flux generated by the vertical word lines 42 passing through apertures 37 in substrate 32 whereby the flux in keeper 34*a* is caused to pass through the memory elements 60*a*, 60*b* in the plane thereof and along the longitudinal axes of sense-digit lines 38, 40. FIG. 5*b* is presented as another embodiment of the keeper 34 of FIG. 5*a* but wherein the keeper 35 of FIG. *b* is formed in a continuous strip having a plurality of notches 39 therein for preventing the transfer of word line generated flux between the adjacent memory elements 60*a*, 60*b* along their common sense-digit lines 38, 40.

Figure 6A:
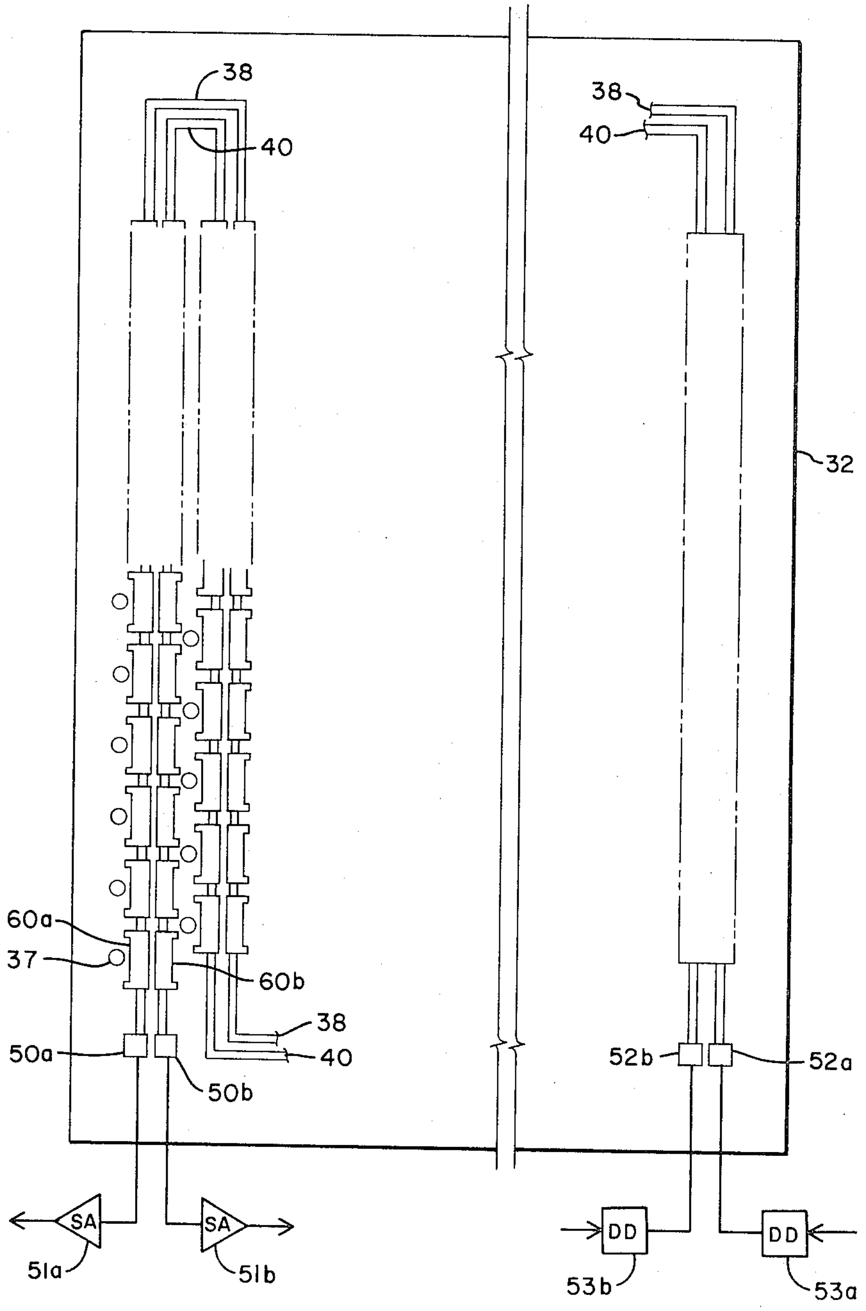
FIGS. 6*a* and 6*b* are different embodiments of the configuration of the sense-digit lines on the memory planes of the present invention.

With particular reference to FIG. 6a there is presented a plan view of the substrate 32, less keepers 34 or 35, for showing the configuration of the parallel running sense-digit lines 38, 40 passing along the surface of substrate 32 from sense amplifier terminals 50*a*, 50*b* to digit driver terminals 52*a*, 52*b*. This illustrates how the two memory elements 60*a*, 60*b* are associated with each aperture 37 in substrate 32, said apertures 37 of adjacent pairs of sense-digit lines being staggered, as in FIG. 4, to provide minimum flux transfer between adjacent memory elements 60*a*, 60*b* and word lines 42. In this configuration, each sense-digit line, e.g., sense-digit line 38, has an associated sense amplifier, e.g., sense amplifier 51*a*, and an associated digit driver, e.g., digit driver 53*a*.

Figure 6B:
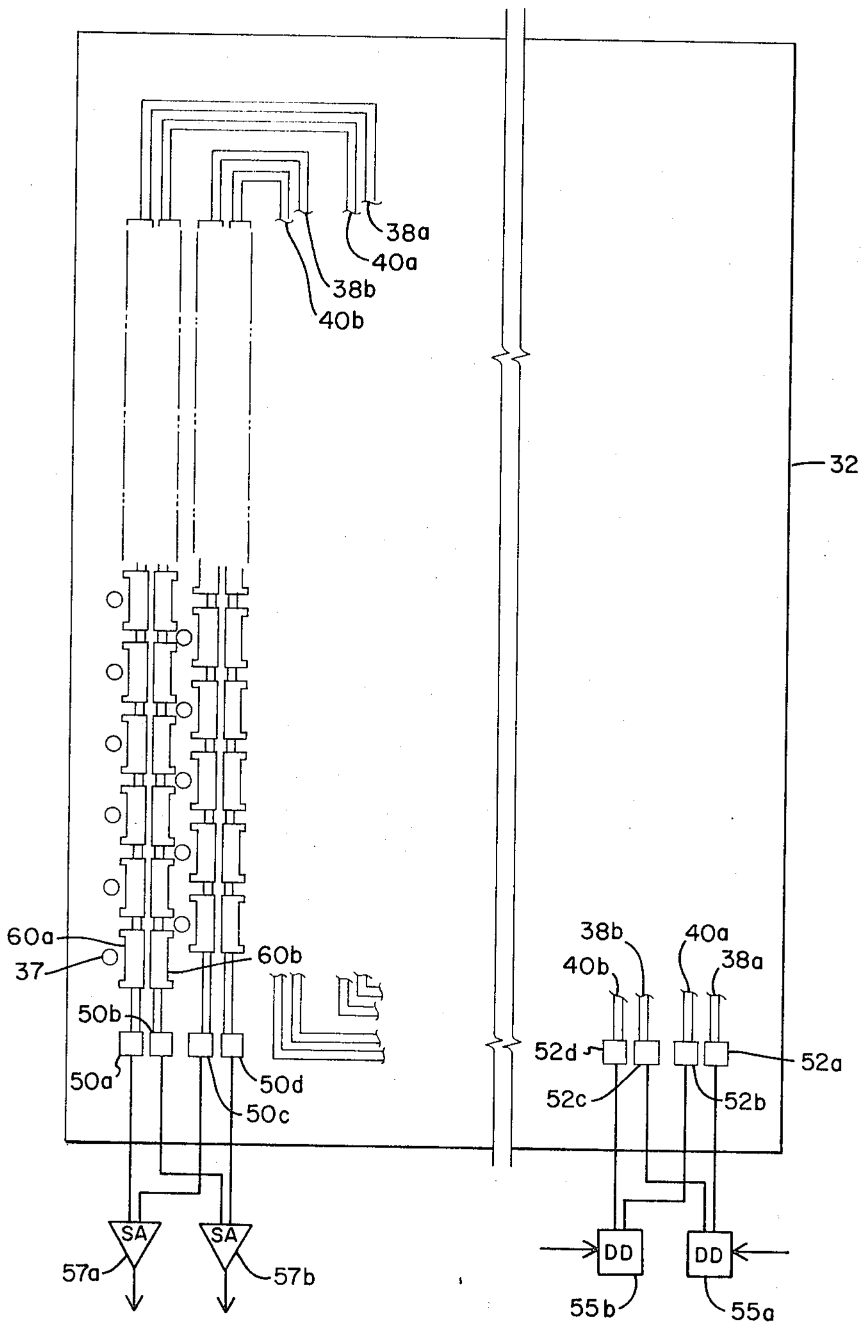

With particular reference to FIG. 6*b* there is presented a second embodiment of the configuration of FIG. 6*a*. In this arrangement the external electronics are coupled in a different manner so as to provide a differential, common-mode-rejection along the adjacent sense-digit line pairs. In this configuration, two pairs of sense-digit lines, pairs 38*a*, 40*a* and 38*b*, 40*b* pass along the surface of substrate 32 from sense amplifier terminals 50*a*, 50*b* and 50*c*, 50*d* to corresponding digit driver terminals 52*a*, 52*b* and 52*c*, 52*d*. Each sense amplifier and digit driver is coupled to the terminals of the corresponding positioned sense-digit lines of the adjacent pair of sense-digit lines, e.g., sense amplifier 57*a* is coupled across sense amplifier terminals 50*a*, 50*c* of sense-digit lines 38*a*, 38*b* while digit driver 55*a* is, at the opposite end, coupled across digit driver terminals 52*a*, 52*c*.

Figures 7, 8, 9, 10, 11, 12:
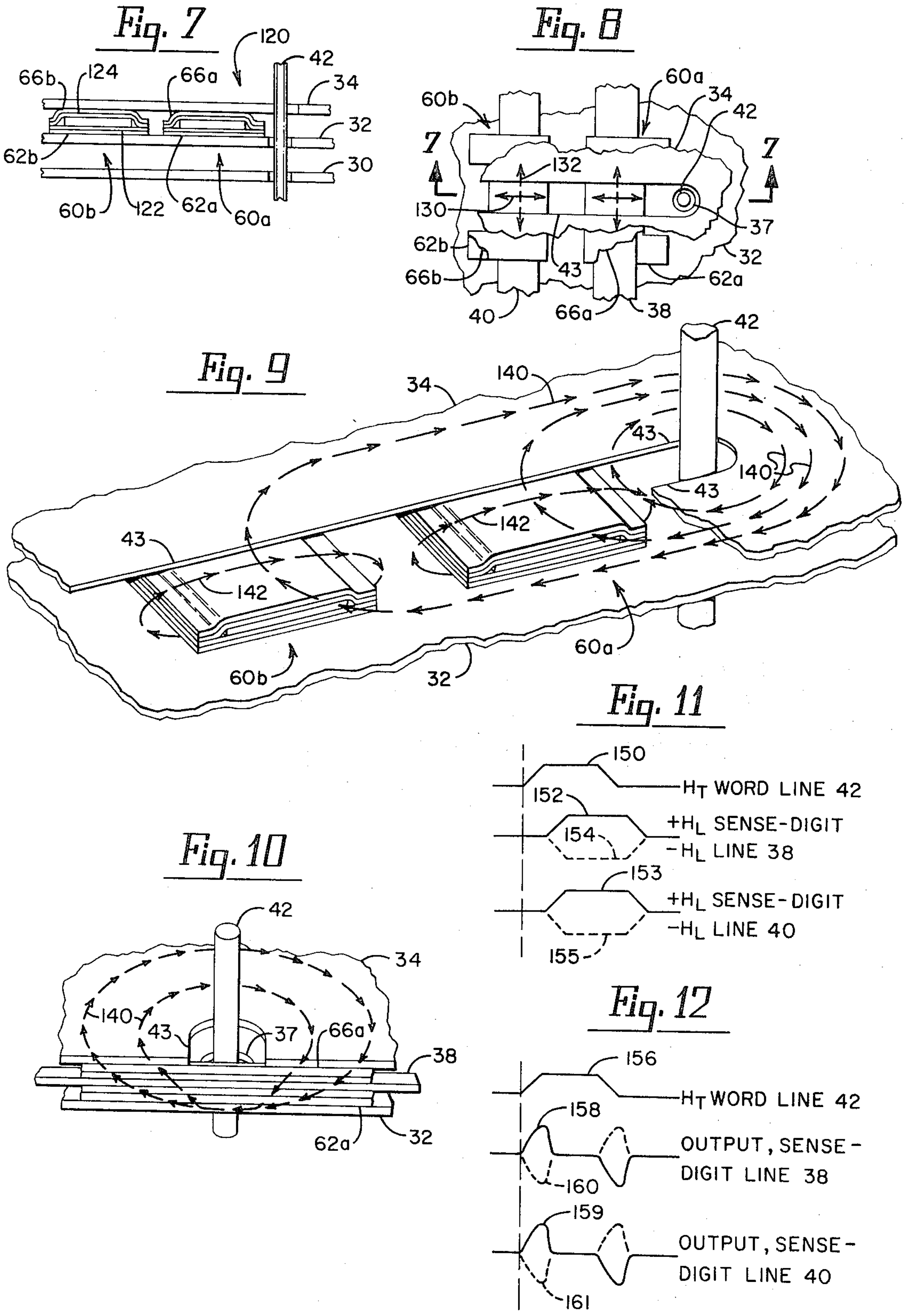
FIG. 7 is a diagrammatic illustration of a cross-section of a memory element taken along line 7—7 of FIG. 8.
FIG. 8 is a diagrammatic illustration of a plan view of the memory element of FIG. 2.
FIG. 9 is an isometric view of a portion of the memory element of FIG. 2.
FIG. 10 is a diagrammatic illustration of a cross-sectional view of the memory element of FIG. 9.
FIG. 11 is an illustration of the signal waveform associated with the write operation of the memory element of FIGS. 9, 10.
FIG. 12 is an illustration of the signal waveforms associated with the read operation of the memory element of FIGS. 9 and 10.

With particular reference to FIG. 7 there is presented a diagrammatic illustration of a cross-section of the Mated-Film memory elements 60*a*, 60*b* and keeper 34 that form the basic memory cell 120 of the present invention. The Mated-Film memory elements 60*a*, 60*b* are as more fully described in the R. J. Bergman, et al., U.S. Pat. No. 3,435,435. In the preferred embodiment layers 62 and 66 are elements of 4,000 Angstroms (A) in thickness of approximately 80% Ni-20% Fe that are vapor deposited upon a 0.0060 inch thick glass substrate 32 and have an overall planar dimension of approximately 0.014 inch in width and 0.025 inch in length. Layers 62 and 66 are separated by vapor deposit layers 122 and 124 of silicone monoxide (SiO) each of approximately 5,000 A thickness that act as diffusing-preventing-layers between sense-digit lines 38, 40 of FIG. 4, which are copper strips of approximately 40,000 A in thickness, and layers 62 and 66 during the vapor deposition process. The final element of memory cell 120 is keeper 34 which is a layer of high permeability material, such as a Conetic sheet, of approximately 0.0020 inch thickness formed upon a Mylar layer of approximately 0.050 inch thickness which, as will more fully be described below, acts as a flux return path for the transverse drive field $H_T$ that is generated in the area of memory cell 120 by a current signal flowing through word line 42. Additionally, there is illustrated the shielding effect of shield-plate 30 as previously discussed with reference to FIG. 2.

The memory plane assembly formed by the sandwiched construction of substrate 32 through layer 66 (not including word line 42, shield-plate 30, or keeper 34 and its supporting Mylar substrate) is an integral package that may be formed by a continuous deposition process such as disclosed in the S. M. Reubens U.S. Pat. Nos. 2,900,282 and 3,155,561 or by the separate layers suitably affixed by adhesive material. In this arrangement of the preferred embodiment, layers 62 and 66 are formed with an anisotropic axis in the closed direction whereby a current signal coupled to conductors 38, 40 establishes a longitudinal drive field $H_L$ in the area of layers 62 and 66 in a circumferential direction of a first or of a second and opposite direction representative of a stored 1 or 0 as a function of the polarity of the current signal applied thereto. With a proper current signal coupled to the word line 42 there is established in the area of cell 120 a transverse drive field $H_T$ that tends to aligh the magnetization M of layers 62 and 66 into substantial alignment along the hard axis 132 of element 60, along a line orthogonal to the easy axis 130 of element 60 (see FIG. 8).

With particular reference to FIG. 8 there is presented a diagrammatic illustration of a plan view of the memory cell 120 of the present invention of which FIG. 7 is a cross-section taken along line 7—7 thereof. In this illustration, non-functional parts such as layers 122 and 124 and the Mylar substrate of keeper 34 are omitted for the sake of clarity. This illustration shows the stacked arrangement of substrate 32, layer 62, sense-digit lines 38, 40, layer 66 and keeper 34. Additionally, there is illustrated the relationship of the easy axis 130 and hard axis 132 of memory element 60 with respect to sense-digit lines 38, 40 and word line 42. Additionally, there is shown the aperture 43 formed in keeper 34 whereby the opposite sides of aperture 43 are inductively coupled to the opposite ends of layers 62, 66 of memory elements 60*a*, 60*b* for directing the flux in keeper 34 to flow between such opposite sides of aperture 43 through layers 62, 66 of memory elements 60*a*, 60*b* as a hard axis drive field $H_T$. Additionally, the bottom of aperture 43 in keeper 34 mates with mating hole 37 in substrate 32 and hole 46 in shield-plate 30 providing a means whereby word line 42 may pass through memory plane 12 and providing a proper orientation of word line 42 with respect to cell 120.

With particular reference to FIG. 9 there is illustrated an isometric view of a portion of memory cell 120 and its intersection with the transverse drive field $H_T$ generated by an energized word line 42. This illustration is presented to show the general configuration of the path of the magnetic flux generated by a current signal flowing through word line 42. With a suitable current signal coupled to word line 42 there is established about word line 42 a magnetic field represented by arrows 140 flowing in a circumferential direction thereabout. This circumferential field about word line 42 seeks a path of low reluctance and, accordingly, concentrates in the planar, partially-closed flux path presented by keeper 34. Keeper 34, except in the area of memory elements 60*a*, 60*b* as caused by aperture 43, forms a continuous flux path of low reluctance. However, in the area of memory elements 60*a*, 60*b* there is an air gap formed by aperture 43 presenting an area of high reluctance. This area of high reluctance in the area of memory elements 60*a*, 60*b* formed by aperture 43 causes the flux flowing in keeper 34, due to the current signal flowing through word line 42, to move down into the superposed layers 62 and 66 producing an area of high flux concentration in the area of memory elements 60*a*, 60*b*. This magnetic flux in the area of memory elements 60 and aperture 43 in keeper 34 is a transverse drive field $H_T$ oriented orthogonal to easy axis 130 tending to cause the magnetization(vector) M of memory elements 60 to become aligned with hard axis 132—see FIG. 8. With appropriate current signals coupled to sense-digit lines 38, 40 there is established about sense-digit lines 38, 40 circumferential magnetic fields schematically represented by arrows 142 which magnetic field is in substantial alignment with the easy axis 130 in the area of memory elements 60*a*, 60*b*. With the magnetic field schematically illustrated by arrows 140 established by a suitable current signal flowing through word line 42 being, in the area of elements 60*a*, 60*b*, in substantial alignment with hard axis 132 of elements 60*a*, 60*b* there are provided two magnetic fields that are orthogonal to each other in the area of memory elements 60*a*, 60*b* and that are vectorally additive such that by the proper selection of the relative field intensities and polarities, the magnetization M of memory elements 60*a*, 60*b* may be selectively established into any one of a plurality of previously determined magnetic states.

With particular reference to FIG. 10 there is illustrated a diagrammatic illustration of a cross-sectional view taken from FIG. 9 along the longitudinal axis of sense-digit line 38. This illustration is presented to particularly point out the manner in which the magnetic field established by the current signal flowing through word line 42, as schematically illustrated by arrows 140, flows through the low reluctance path presented by keeper 34 and when presented by the high reluctance path formed by aperture 43 moves out of keeper 34 into layers 62 and 66 and then back up into keeper 34 on the other side of aperture 43. Thus, it is particularly pointed out that the purpose of keeper 34 is to act as a "keeper" or low reluctance path for the transverse drive field $H_T$ generated by a current signal passing through word line 42 and by the action of the aperture 43 therein concentrating such magnetic field in the areas of memory elements 60*a*, 60*b*. The effect of keeper 34 is, by reducing the reluctance of the flux path of the transverse word drive fields, to substantially reduce the current signal intensities required in a proper operation of memory elements 60*a*, 60*b*.

With particular reference to FIG. 11 there are presented the waveforms of the current signals utilized to accomplish the write-in operation of memory cell 120 of FIGS. 9 and 10. In this arrangement, transverse drive field 150 is initially applied to elements 60*a*, 60*b* by a current signal flowing through word line 42 rotating the magnetization M of memory elements 60*a*, 60*b* out of alignment with their anisotropic axis 130. Next, longitudinal drive fields 152, 153 for the writing of a 1 or longitudinal drive fields 154, 155 for the writing of a 0 are applied in the areas of memory elements 60*a*, 60*b* by suitable polarity current signals coupled to bit lines 38, 40 which longitudinal drive fields $\pm H_L$ steer the magnetization M of memory elements 60*a*, 60*b* into the particular magnetic polarization along anisotropic axis 130 associated with the respective polarities of waveforms 152, 153 and 154, 155. With the magnetic fields established by suitable current signals flowing through word line 42 and sense-digit lines 38, 40 (see FIG. 8) being, in the areas of memory elements 60*a*, 60*b* in substantial alignment with hard axis 132 and easy axis 130, respectively, there are provided two magnetic fields orthogonal to each other in the areas of memory elements 60*a*, 60*b* that are vectorially additive. By the proper selection of the relative field intensities and polarities of such fields the magnetization M of such memory elements 60*a*, 60*b* may be selectively established into any one of a plurality of previously determined magnetic states in a domain rotational mode as disclosed in the S. M. Reubens U.S. Pat. No. 3,030,612.

With particular reference to FIG. 12 there are illustrated the signal waveforms associated with the readout operation of memory cell 120 of FIGS, 8, 9 and 10. The readout operation is accomplished by the coupling of an appropriate current signal to word line 42 thus generating in the areas of memory elements 60*a*, 60*b* a transverse drive field 156 that only slightly rotates the magnetization of elements 60*a*, 60*b* out of alignment with their anisotropic axis 130 inducing in the associated sense-digit lines 38, 40 output signals 158, 159 or 160, 161 indicative of a stored 1 or 0, respectively, in memory elements 60*a*, 60*b*. As illustrated here, the polarity phase of the output signal during the readout operation is indicative of the informational state of the memory element concerned.

Figure 13:
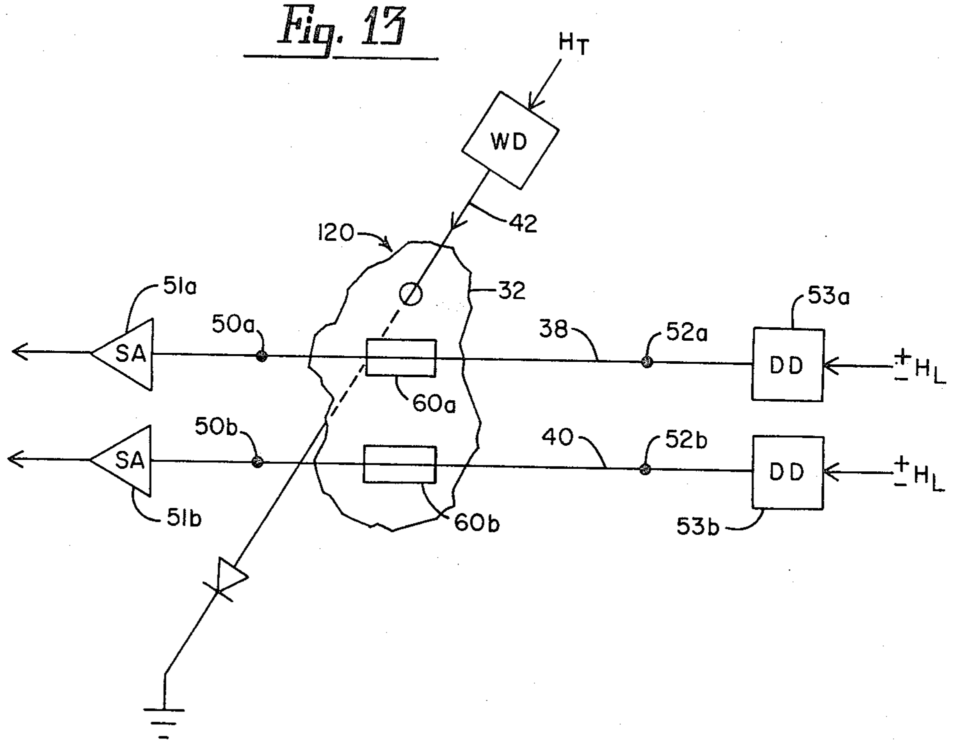
FIG. 13 is a schematic illustration of a typical circuit arrangement for the operation of the memory element configuration of FIG. 6*a*.

With particular reference to FIG. 13 there is presented a schematic illustration of a typical circuit arrangement for the operation of a memory cell 120 arranged in the configuration of FIG. 6*a*. As previously described in FIG. 6*a*, memory plane 12 has two separate sense-digit lines 38, 40 that pass through the memory plane in a parallel manner; sense-digit line 38 couples memory elements 60*a* while sense-digit line 40 couples memory elements 60*b*. The parallel sense-digit lines 38, 40 are at one end coupled to the associated sense amplifiers 51*a*, 51*b* and at the other end to their associated digit drivers 53*a*, 53*b*. In this arrangement, the sense-digit lines 38, 40 and their associated electronics are electronically separated functioning as two separate sense-digit lines coupled to their separate memory elements 60*a*, 60*b*.

Figure 14:
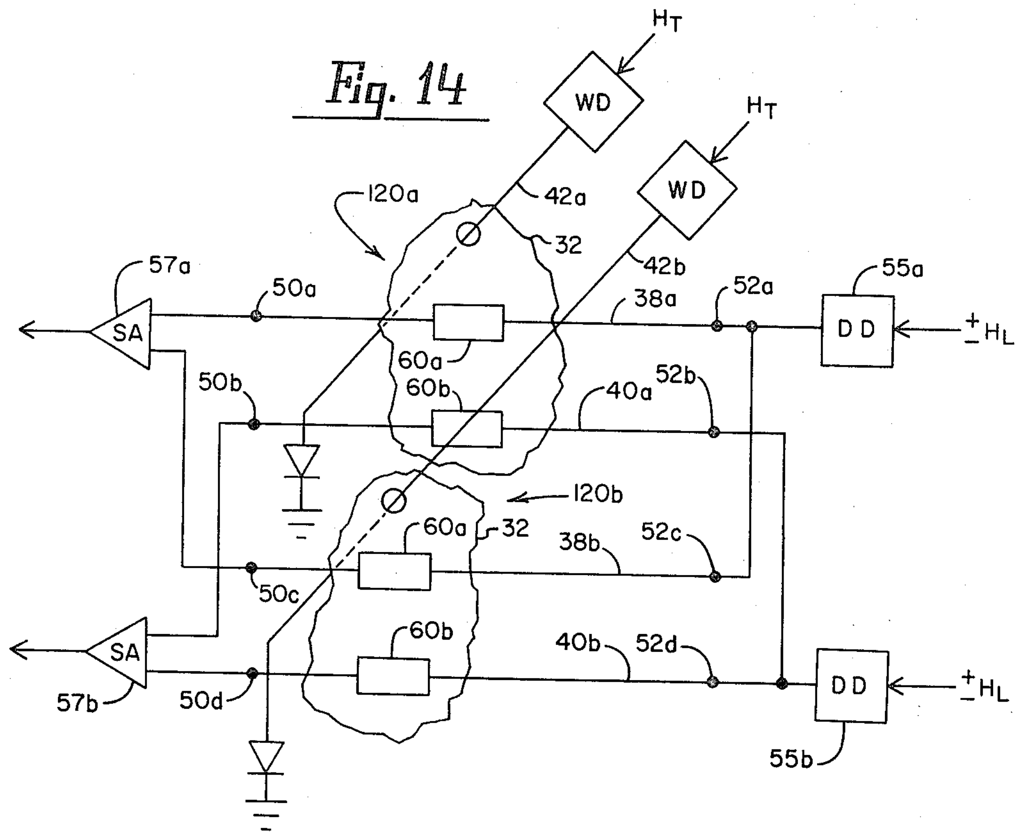
FIG. 14 is a schematic illustration of a typical circuit arrangement for the operation of the memory element configuration of FIG. 6*b*.

With particular reference to FIG. 14 there is presented a schematic illustration of a typical circuit arrangement for the operation of a pair of memory cells 120*a*, 120*b* arranged in the configuration of FIG. 6*b*. In this arrangement, as illustrated in more detail in FIG. 6*b* and in contrast to the configuration of FIG. 6*a*, memory plane 12 has two pairs of sense-digit lines, pairs 38*a*, 40*a* and 38*b*, 40*b* that pass along the surface of substrate 32 from the associated sense amplifier terminals 50*a*, 50*b* and 50*c*, 50*d* to the corresponding digit driver terminals 52*a*, 52*b* and 52*c*, 52*d*. The corresponding positioned sense-digit lines of the two pairs of sense-digit lines, e.g., sense-digit lines 38*a*, 38*b* are common coupled at their digit driver terminals 52*a*, 52*c* to digit driver 55*a* while their sense amplifier terminals 50*a*, 50*c* are coupled across differential sense amplifier 57*a*. In a like manner, the like-positioned sense-digit lines 40*a*, 40*b* of the two adjacent pairs of sense-digit lines are, at their digit driver terminals 52*b*, 52*d* common coupled to digit drivers 55*b* while their sense amplifier terminals 50*b*, 50*d* are coupled across differential sense amplifier 57*b*.

In the arrangement of FIG. 14 the like-positioned sense-digit lines of adjacent pairs of sense-digit lines act as a balanced strip line pair providing common mode rejection of spurious noise signals at their associated differential sense amplifiers. As in the embodiment of FIG. 13, only one energized word line at a time, e.g., word line 42*a*, couples its associated transverse drive field $H_T$ to the associated memory elements 60*a*, 60*b*, of its associated memory cell 120*a*, the information contents of which are read out at their associated differential sense amplifiers 57*a*, 57*b*.

Figure 15:
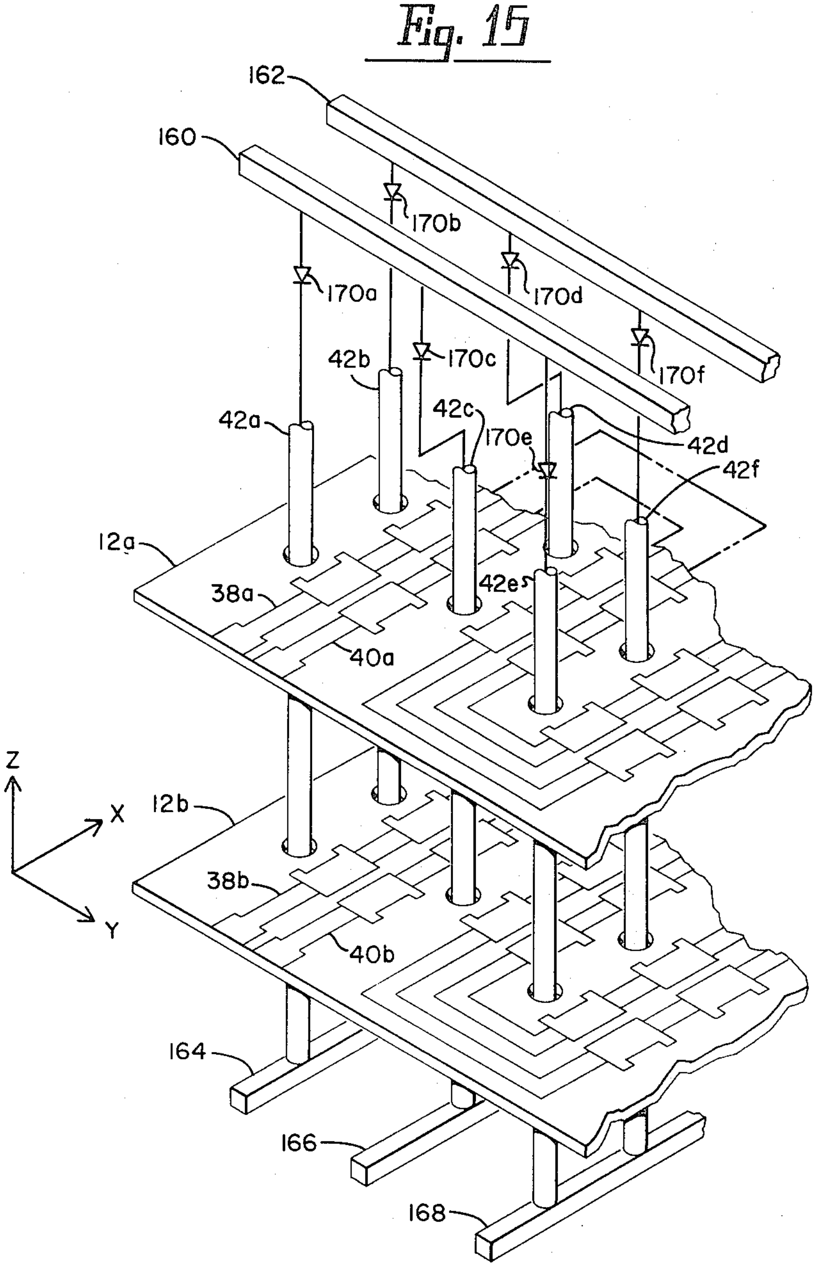
FIG. 15 is a diagrammatic illustration of a two memory plane, six memory cells per memory plane configuration of FIG. 6*a*.

With particular reference to FIG. 15 there is presented an isometric view of a schematic illustration of the present invention illustrating but only two memory planes 12 illustrating only six word lines 42 and their associated six momory cells 120 each of pairs of memory elements 60*a*, 60*b* per memory plane 12. In this arrangement there is illustrated two upper diverter lines 160, 162 that run in the Y dimension parallel to the planes of memory planes 12 and three lower diverter lines 164, 166, 168 that run in the X dimension parallel to the planes of memory planes 12. The six vertically running word lines 42*a* through 42*f* are coupled by means of their associated diodes 170*a* through 170*f* to the associated upper diverter lines 160, 162 at the top and are directly coupled to their associated lower diverter lines 164, 166, 168 at the bottom whereby the concurrent selection of one upper diverter line, e.g., line 160, and one lower diverter line, e.g., line 164, causes the proper polarity current signal to pass through the one selected word line, e.g., word line 42*a*.

The pairs of memory elements 60*a*, 60*b* on memory planes 12*a*, 12*b* that are associated with word line 42*a* are affected by the so-generated transverse drive field $H_T$ whereby the magnetization M of the so-affected memory elements 60*a*, 60*b* are affected as previously discussed with particular reference to FIGS. 8, 9 and 10. As discussed hereinabove, for the readout of the information stored in the memory elements 60*a*, 60*b* associated with the one selected word line 42*a* only the single word current signal $H_T$ is coupled to the one selected word line 42*a*. However, for the concurrent writing into of the pair of memory elements 60*a*, 60*b* the proper polarity current signals must be concurrently coupled to the associated sense-digit lines 38, 40 for generating the proper polarity longitudinal drive field $\pm H_L$ which concurrently applied longitudinal and transverse drive fields establishes the magnetization M of the so-affected memory elements 60*a*, 60*b* associated with the one selected word line 42*a* into the associated magnetic polarization along their respective easy axes, i.e., orthogonal to the longitudinal axes of the associated sense-digit lines 38, 40.

What is claimed is:

1. A two-dimensional array of magnetizable memory elements, comprising:

a nonmagnetizable planar substrate member having a plurality of apertures therethrough;

a separate word line passing vertically through each of said apertures in said substrate member;

first and second separate memory elements associated with each of said apertures in said substrate member and both inductively coupled to the one associated word line;

a plurality of keepers of high permeability material, each keeper having an opening therein that is oriented about an associated one of said apertures in said substrate member and whose opposing sides are inductively coupled to opposing ends of the first and second memory elements that are associated with each of said apertures;

each of said first memory elements including first and second planar layers of magnetizable material sandwicing a first conductive member therebetween for forming a substantially closed circumferential flux path thereabout;

each of said second memory elements including first and second planar layers of magnetizable material sandwiching a second conductive member therebetween for forming a substantially closed circumferential flux path thereabout;

information stored in said memory elements as first or second and opposite megnetization polarizations oriented along said circumferential flux paths;

means intercoupling all of said first conductive strips for forming a first sense-digit line;

means intercoupling all of said second conductive strips for forming a second sense-digit line separate from said first sense-digit line;

word line selection means coupling a word line selection signal to only one of said word lines for inductively coupling a planar word drive field to both said first and second associated memory elements which word drive field is oriented substantially orthogonal to said circumferential flux paths;

said word drive field concurrently affecting the magnetization polarizations of both said first and second associated memory elements for inducing in said first and second sense-digit lines, respectively, associated first and second signals that are indicative of the informational state of the so-affected first and second associated memory elements, respectively.

2. A two-dimensional array of magnetizable memory elements, comprising:

a nonmagnetizable planar substrate member having a plurality of apertures therethrough;

a separate word line passing vertically through an associated one of said apertures in said substrate member;

first and second separate memory elements associated with each of said apertures in said substrate member and both inductively coupled to the one associated word line;

a plurality of keepers of high permeability material, each keeper having an opening therein that is oriented about an associated one of said apertures in said substrate member and whose opposing sides are inductively coupled to opposing ends of the first and second memory elements that are associated with each of said apertures;

each of said first memory elements including a magnetizable material about a first conductive member for forming a substantially closed circumferential flux path thereabout;

each of said second memory elements including a magnetizable material about a second conductive member for forming a substantially closed circumferential flux path thereabout;

information stored in said memory elements as first or second and opposite magnetization polarizations oriented along said circumferential flux paths;

means intercoupling all of said first conductive strips for forming a first sense-digit line;

means intercoupling all of said second conductive strips for forming a second sense-digit line separate from said first sense-digit line;

word line selection means coupling a word line selection signal to only one of said word lines for inductively coupling a word drive field to both said first and second associated memory elements which word drive field is oriented substantially orthogonal to said circumferential flux paths;

said word drive field concurrently affecting the magnetization polarizations of both said first and second associated memory elements for inducing in said first and second sense-digit lines, respectively, associated first and second signals that are indicative of the informational state of the so-affected first and second associated memory elements, respectively.

3. A three-dimensional array of magnetizable memory elements, comprising:

a plurality of stacked, superposed two-dimensional planar arrays, each including:

a nonmagnetizable planar substrate member having an aperture therethrough;

first and second separate memory elements associated with said aperture in said substrate member;

a keeper of high permeability material having an opening therein that is oriented about said aperture in said substrate member and whose opposing sides are inductively coupled to opposing ends of both of said memory elements;

said first memory element including first and second planar layers of magnetizable material sandwiching a first conductive member therebetween for forming a substantially closed circumferential flux path thereabout;

said second memory element including first and second planar layers of magnetizable material sandwiching a second conductive member therebetween for forming a substantially closed circumferential flux path thereabout;

information stored in said memory elements as first or second and opposite magnetization polarizations oriented along said circumferential flux paths;

a word line passing vertically through the superposed apertures in said superposed two-dimensional planar arrays and inductively coupled to the first and second separate memory elements that are associated with the associated aperture;

word line selection means coupling a word line selection signal to said word line for inductively coupling a planar word drive field to both the first and second associated memory elements of said superposed two-dimensional planar arrays which word drive field is oriented substantially orthogonal to said circumferential flux paths;

said word drive field concurrently affecting the magnetization polarizations of both the first and second associated memory elements of said superposed two-dimensional planar arrays for inducing in the associated first and second conductive members, respectively, associated first and second signals that are indicative of the informational state of the so-affected first and second associated memory elements, respectively.

4. A three-dimensional array of magnetizable memory elements, comprising:

a plurality of stacked, superposed two-dimensional planar arrays, each including:

a nonmagnetizable planar substrate member having a plurality of separate apertures therethrough;

first and second separate memory elements associated with each of said apertures in said substrate member;

a plurality of keepers of high permeability material, each keeper having an opening therein that is oriented about an associated one of said apertures in said substrate member and whose opposing sides are inductively coupled to opposing ends of the first and second memory elements that are associated with each of said apertures;

each of said first memory elements including first and second planar layers of magnetizable material sandwiching a first conductive member therebetween for forming a substantially closed circumferential flux path thereabout;

each of said second memory elements including first and second planar layers of magnetizable material sandwiching a second conductive member therebetween for forming a substantially closed circumferential flux path thereabout;

information stored in said memory elements as first or second and opposite magnetization polarizations oriented along said circumferential flux paths;

means intercoupling all of said first conductive strips for forming a first sense-digit line;

means intercoupling all of said second conductive strips for forming a second sense-digit line separate from said first sense-digit line;

a plurality of separate word lines, each passing vertically through the separate, superposed apertures in said superposed two-dimensional planar arrays and inductively coupled to only the first and second separate memory elements that are associated with the associated aperture;

word line selection means coupling a word line selection signal to only one of said word lines for inductively coupling a planar word drive field to both the first and second associated memory elements of said superposed two-dimensional planar arrays which word drive field is oriented substantially orthogonal to said circumferential flux paths;

said word drive field concurrently affecting the magnetization polarizations of both the first and second associated memory elements of said superposed two-dimensional planar arrays for inducing in the associated first and second sense-digit lines, respectively, associated first and second signals that are indicative of the informational state of the so-affected first and second associated memory elements, respectively.

* * * * *